(No Model.)

G. ABBOTT.
MILK PAIL HOLDER.

No. 355,044. Patented Dec. 28, 1886.

WITNESSES:

INVENTOR:
G. Abbott
BY Munn &Co
ATTORNEYS.

UNITED STATES PATENT OFFICE.

GRANVILLE ABBOTT, OF HARRISON, MINNESOTA.

MILK-PAIL HOLDER.

SPECIFICATION forming part of Letters Patent No. 355,044, dated December 28, 1886.

Application filed May 28, 1886. Serial No. 203,547. (No model.)

*To all whom it may concern:*

Be it known that I, GRANVILLE ABBOTT, of Harrison, in the county of Kandiyohi and State of Minnesota, have invented a new and improved Milk-Pail Holder, of which the following is a full, clear, and exact description.

This invention relates to that class of devices used for holding milk-pails while milking, and has for its object to relieve the milker from the fatigue incident to holding the milk-pail between the knees, as ordinarily practiced, and also to insure the safety of the pail and its contents.

To these ends the invention consists of an adjustable hoop provided with arms and with loosely-attached catches, as will be hereinafter more specifically set forth.

Reference is to be had to the accompanying drawings, forming a part of this specification, in which similar letters of reference indicate corresponding parts in both the figures.

Figure 1:
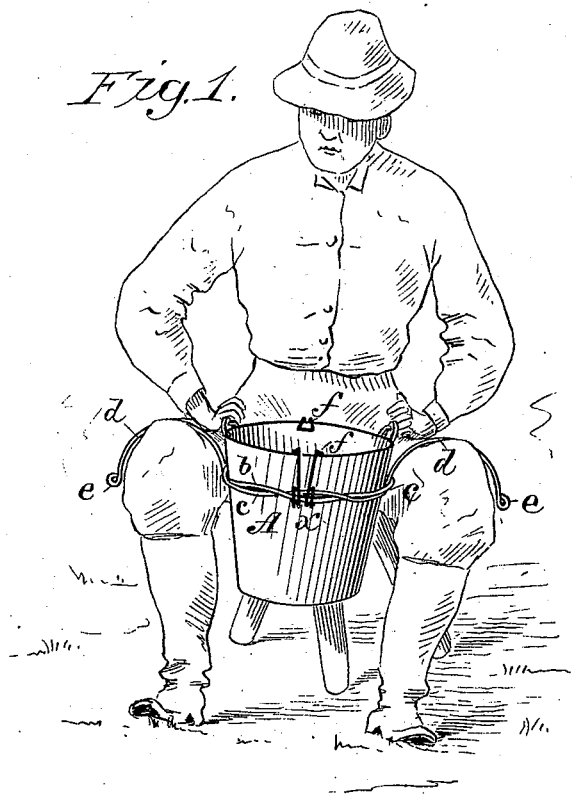
Figure 2:
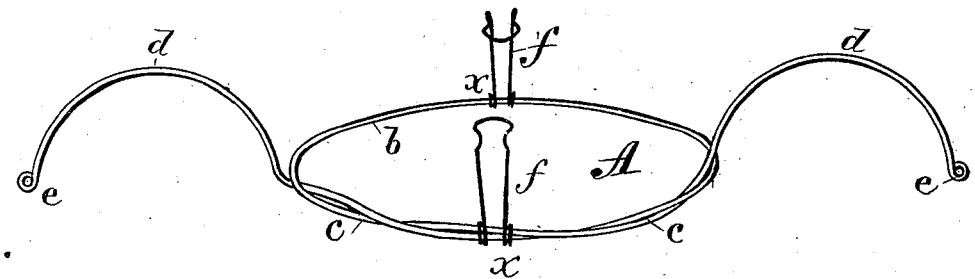

Figure 1 represents my holder in use, supporting a pail on the knees or lap of an operator. Fig. 2 represents the holder detached from the pail.

Ordinarily milk-pails are held at the proper height during milking by the pressure on them of the knees and legs; but this is an inconvenient method, fatiguing to the operator and unsafe, as any disturbance is apt to cause the pail to be thrown down and upset. To do away with the objections incident to the old method I provide the pail-holder, which will now be described.

The holder A is made of a single piece of wire or other suitable material bent to form the pail-holding hoop $b$, the two parts of the wire being overlapped along one side of the hoop and lightly twisted, as at $c\ c$, for about one-half the circumference of the hoop, as shown. The parts of the wire are then bent outwardly at the opposite sides of the hoop and curved approximately semicircularly in a plane at right angles to the plane of the hoop to form supporting-arms $d\ d$, and these arms are provided at their extremities with eyes $e$ or equivalent guards.

Midway between the arms $d\ d$, at opposite sides of the loop, bent-wire catches $f\ f$ are loosely attached by loops encircling the wire of the hoop. By means of its twisted portion the hoop can be adjusted to fit pails of different sizes. This adjustment having been made, the holder is attached to the pail in the following manner: The pail is passed down through the hoop, which should be of such size as to catch on its sides a few inches below the top. The hooks $f\ f$ are then swung up and caught upon the top edge of the pail, as shown in Fig. 1. Thus secured the holder cannot drop off the pail, and can be carried about without taking off the holder.

In use the arms $d\ d$ are supported upon the knees, as shown in Fig. 1, and the weight of the pail bears by the curved arms upon the lap of the operator. Thus a positive support is secured and the safety of the pail is rendered independent of the grasp by the knees, and thus supported the operator by moving forward or backward can alter the position of the pail and its height, while it is almost impossible for the milk to be lost through upsetting.

The construction of the holder is such that it remains attached to the pail, and much time that would otherwise be lost if it had to be removed and replaced is saved.

I do not restrict myself to the twisted portion $c$ of the hoop as a means of adjustment, as any equivalent therefor can be used.

The whole may be constructed of cheap material and in a simple manner, only three pieces being required.

Having thus described my invention, what I claim as new, and desire to secure by Letters Patent, is—

1. The hoop $b$, with twisted portion $c\ c$ as a means of adjustment, in combination with arms $d\ d$ and hooks $f\ f$, substantially as shown and described.

2. The pail-holder herein shown and described, consisting of a piece of wire bent to form a pail-supporting hoop, having its parts overlapped and lightly twisted along one side of the hoop, and then bent outwardly and curved to form supporting-arms.

3. The combination, with the pail-holder $b\ c\ d$, of the catches $f$, loosely attached on the sides of its pail-holding loop, substantially as shown and described.

GRANVILLE ABBOTT.

Witnesses:
MARTIN OLSON,
HENRY STENE.